United States Patent
Kimchi et al.

(10) Patent No.: US 10,057,340 B2
(45) Date of Patent: *Aug. 21, 2018

(54) COMPUTING SYSTEM FOR MANAGING DATA

(71) Applicant: Microsoft Technology Licensing, LLC, Redmond, WA (US)

(72) Inventors: Gur Kimchi, Bellevue, WA (US);
Roger Barga, Bellevue, WA (US);
Vinay Gupta, Sammamish, WA (US);
Zachary Apter, Seattle, WA (US);
Stelios Paparizos, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,649

(22) Filed: Oct. 6, 2016

(65) Prior Publication Data

US 2017/0026466 A1 Jan. 26, 2017

Related U.S. Application Data

(63) Continuation of application No. 14/880,928, filed on Oct. 12, 2015, now Pat. No. 9,479,581, which is a
(Continued)

(51) Int. Cl.
*G06F 15/16* (2006.01)
*H04L 29/08* (2006.01)
(Continued)

(52) U.S. Cl.
CPC ..... *H04L 67/1046* (2013.01); *G06Q 30/0267* (2013.01); *H04L 63/08* (2013.01);
(Continued)

(58) Field of Classification Search
CPC ................. H04L 63/104; H04L 67/1046
See application file for complete search history.

(56) References Cited

U.S. PATENT DOCUMENTS

| 7,363,343 | B2 | 4/2008 | Bucher |
| 7,574,523 | B2 | 8/2009 | Traversat et al. |

(Continued)

FOREIGN PATENT DOCUMENTS

| CN | 1708759 A | 12/2005 |
| CN | 102802173 A | 11/2012 |

(Continued)

OTHER PUBLICATIONS

Ng, W. et al., "PeerDB: A P2P-based System for Distributed Data Sharing," Proceedings of the 19th International Conference on Data Engineering (ICDE'03), Mar. 5, 2003, Bangalore, India, 12 pages.
(Continued)

*Primary Examiner* — Yves Dalencourt
(74) *Attorney, Agent, or Firm* — Alleman Hall Creasman & Tuttle LLP (57) ABSTRACT

Various embodiments are described for systems and methods for managing data. The system may include a device group configured for peer-to-peer communications, the device group including a computing device and one or more peer computing devices. The system includes a cross device application programming interface (API) that is implemented as a device group API client executed on the computing device and each of the peer computing devices. Each device group API client includes a permissions module that is configured to determine whether a request satisfies a device-group-specific permission for access to data stored on any device associated with the device group. Upon authorization of the request, a file storage module is configured to retrieve and output the requested file.

20 Claims, 4 Drawing Sheets

Related U.S. Application Data continuation of application No. 13/167,461, filed on Jun. 23, 2011, now Pat. No. 9,172,708.

(51) Int. Cl.
    *H04L 29/06*     (2006.01)
    *G06Q 30/02*     (2012.01)

(52) U.S. Cl.
    CPC ............ *H04L 63/104* (2013.01); *H04L 67/06* (2013.01); *H04L 67/1068* (2013.01)

(56) References Cited

U.S. PATENT DOCUMENTS

| | | | |
|---|---|---|---|
| 7,600,252 | B2 | 10/2009 | Illowsky et al. |
| 9,172,708 | B2 * | 10/2015 | Kimchi ............... H04L 67/1046 |
| 9,479,581 | B2 * | 10/2016 | Kimchi ............... H04L 67/1046 |
| 2002/0143855 | A1 | 10/2002 | Traversat et al. |
| 2004/0122917 | A1 | 6/2004 | Menon et al. |
| 2006/0075034 | A1 | 4/2006 | Lakkala et al. |
| 2007/0117586 | A1 | 5/2007 | Billmaier et al. |
| 2008/0250120 | A1 | 10/2008 | Mick et al. |
| 2009/0222517 | A1 | 9/2009 | Kalofonos et al. |
| 2009/0259667 | A1 | 10/2009 | Wang et al. |
| 2009/0271412 | A1 | 10/2009 | Lacapra et al. |
| 2010/0050187 | A1 | 2/2010 | Bender |
| 2011/0055935 | A1 | 3/2011 | Karaoguz et al. |
| 2012/0221639 | A1 | 8/2012 | Mallet et al. |

FOREIGN PATENT DOCUMENTS

| | | |
|---|---|---|
| EP | 1229443 A2 | 1/2002 |
| WO | 03058375 A2 | 7/2003 |

OTHER PUBLICATIONS

Tamassia, R. et al., "Efficient Content Authentication in Peer-to-peer Networks," Proceedings of the 5th International Conference on Applied Cryptography and Network Security (ACNS '07), Jun. 5, 2007, Zhuhai, China, 19 pages.

Otto, F. et al., "A Model for Data Management in Peer-to-Peer Systems," International Journal of Computing and ICT Research, vol. 1, No. 2, Dec. 2007, 7 pages.

Oualha, N. et al., "Secure P2P Data Storage and Maintenance," International Journal of Digital Multimedia Broadcasting, vol. 2010, Article ID 720251, Available as Early as Jan. 17, 2010, 11 pages.

ISA Korean Intellectual Property Office, International Search Report and Written Opinion Issued in Application No. PCT/US2012/043168, dated Mar. 25, 2013, WIPO, 9 pages.

United States Patent and Trademark Office, Office Action Issued in U.S. Appl. No. 13/167,461, dated Jan. 22, 2014, 15 pages.

United States Patent and Trademark Office, Office Action Issued in U.S. Appl. No. 13/167,461, dated Jan. 2, 2015, 19 pages.

European Patent Office, Extended European Search Report Issued in Application No. 12803443.6, dated Mar. 24, 2015, Germany, 6 pages.

State Intellectual Property Office of the People's Republic of China, First Office Action Issued in Application No. 201280030601.6, dated Jun. 17, 2015, 14 pages.

United States Patent and Trademark Office, Notice of Allowance Issued in U.S. Appl. No. 13/167,461, dated Jul. 2, 2015, 5 pages.

Taiwan Intellectual Property Office, Office Action and Search Report Issued in Application No. 101115393, dated Nov. 25, 2015, 4 pages. (Submitted with Translation of Search Report).

United States Patent and Trademark Office, Office Action Issued in U.S. Appl. No. 14/880,928, dated Feb. 12, 2016, 10 pages.

State Intellectual Property Office of the People's Republic of China, Second Office Action Issued in Application No. 201280030601.6, dated Feb. 25, 2016, 16 pages.

United States Patent and Trademark Office, Notice of Allowance Issued in U.S. Appl. No. 14/880,928, dated Jul. 1, 2016, 10 pages.

"Transparent Distributed Processing Using Qnet", QNX website, Available Online at http://www.qnx.com/developers/docs/6.3.2/neutrino/prog/qnet.html, Aug. 14, 2007, 13 pages.

"QNX Blackberry Subsidiary—npm-qnet-l4_lite.so", QNX website, Available Online at http://www.qnx.com/developers/docs/6.3.2/neutrino/utilities/n/npm-qnet-l4_lite.so.html, Aug. 14, 2007, 4 pages.

"QNX Momentics Development Suite 6.3.2 Release Notes", QNX website, Available Online at http://www.qnx.com/developers/docs/6.3.2/momentics/release_notes/rel_6.3.2.html, Jun. 26, 2008, 52 pages.

"Office Action issued in European Patent Application No. 12803443.6", dated May 9, 2018, 11 Pages.

* cited by examiner

COMPUTING SYSTEM FOR MANAGING DATA

CROSS REFERENCE TO RELATED APPLICATIONS

This application is a continuation of U.S. patent application Ser. No. 14/880,928, filed Oct. 12, 2015, which is a continuation of U.S. patent application Ser. No. 13/167,461, filed Jun. 23, 2011, now U.S. Pat. No. 9,172,708, both entitled "COMPUTING SYSTEM FOR MANAGING DATA", the entire contents of each of which are hereby incorporated by reference for all purposes.

BACKGROUND

With the proliferation of mobile computing devices, including smartphones, tablets, notebook computers, and the like, users may store personal information and data on multiple, disparate devices. Users with multiple computing devices may find it difficult to manage their data across their various devices. One prior solution has been for users to store their data on remote servers in a cloud computing environment, which refers to a networked computing environment in which client devices can communicate with servers to store files on those servers across the Internet. In this way, users may access their data stored on a cloud server from any computer that has access to the cloud. However, users may have privacy and/or security concerns with storing their data on remote servers, since the physical device that stores the data is not under the users' physical control. Management of data among a single user's multiple devices and among multiple devices of different users within a network may also be difficult. Additionally, facilitating requests from outside the network for in-network data may be difficult.

SUMMARY

Systems and methods for managing data across devices within a device group are disclosed herein. One system may include a device group that includes a computing device and one or more peer computing devices. The system includes a cross device application programming interface (API) that is implemented as a device group API client executed on the computing device and each of the peer computing devices.

Each device group API client includes a device discovery module that is configured to discover the peer computing devices associated with the device group. Each device group API client also includes a peer-to-peer (P2P) module that is configured to engage in P2P communications with each of the peer computing devices of the device group via their respective device group API clients. Each device group API client further includes a file storage module that is configured to enable the device group API client to access files stored in a distributed file store locally on the local device and/or remotely on one or more of the peer computing devices using communications sent via the P2P module. The file storage module is also configured to receive a request from a computer program, via the device group API client, to access a requested file stored in the distributed file store.

Each device group API client also includes a permissions module that is configured to determine whether the request satisfies a device-group-specific permission for access permission of data stored on any device associated with the device group, and if so, to authorize the request to access the requested file, else to deny the request to access the requested file. Upon authorization of the request by the permissions module, the file storage module is also configured to retrieve the requested file from the distributed file store and output the requested file to the computer program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
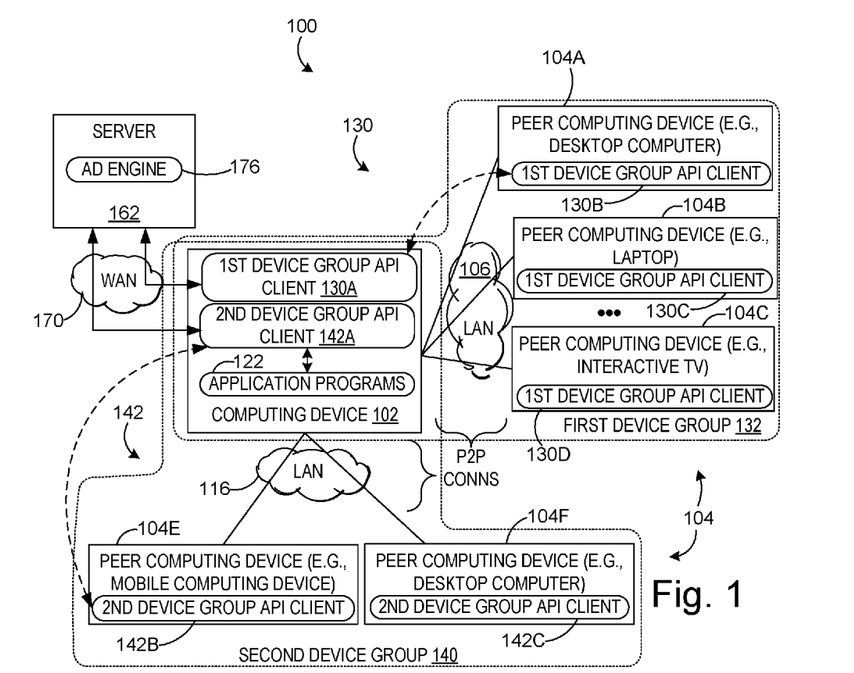
FIG. 1 is a schematic view of a computing system for managing data including a computing device that is a member of a first device group and a second device group.

FIG. 1 is a schematic view of computing system 100 for managing data via peer-to-peer (P2P) communication among a computing device 102 and one or more peer computing devices 104. The computing device 102 communicates with the peer computing devices 104 through P2P connections across networks, which in the disclosed embodiment are local area networks (LANs) 106 and 116. As described in more detail below, the system includes a cross device application programming interface (API) that is implemented in clients on computing device 102 and the peer computing devices 104. The cross device API enables the computing device 102 to be a member of multiple device groups that may have different permissions and different peer computing device members. In other examples, multiple device groups may have different permissions and the same peer computing devices. In still other examples, multiple device groups may have the same permissions but different peer computing devices.

The computing device 102 and peer computing devices 104 may take the form of desktop computers, notebook computers, tablet computers, interactive televisions, mobile computing devices, mobile communication devices, gaming devices, etc. Additionally, it will be appreciated that the LANs 106 and 116 may also take the form of wide area networks (WANs), personal area networks (PANs), or a combination thereof, including the Internet.

Figure 2:
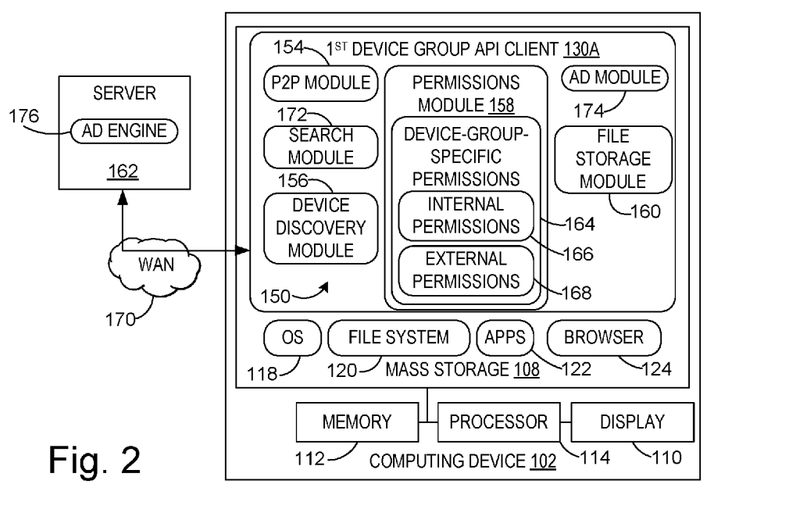
FIG. 2 is a detailed schematic view of the computing device of FIG. 1 showing components of the computing device including a first device group API client.

With reference now to FIG. 2, the computing device 102 includes mass storage 108, a display 110, memory 112 and a processor 114. Programs stored on mass storage 108 may be executed by the processor 114 using memory 112 to achieve various functions described herein. Mass storage 108 includes an operating system 118, a file system 120, one or more application programs (APPs) 122 and a browser 124. As described in more detail below, the mass storage 108 also includes a first device group API client 130A.

Returning to FIG. 1, the computing device 102 is a member of a first device group 132 that also includes as members peer computing devices 104A in the form of a desktop computer, 104B in the form of a laptop, and 104C in the form of an interactive television. In other examples the first device group 132 may also include additional peer computing devices, and the peer computing devices 104A, 104B and/or 104C may be computing devices different from those depicted in FIG. 1. The computing device 102 and each other member of the first device group 132 include an instance of a first device group API client 130, indicated generally in FIG. 1, that enables P2P communications among the members of the first device group 132. More particularly, the computing device 102 includes a first device group API client 130A, peer computing device 104A includes a first device group API client 130B, peer computing device 104B includes a first device group API client 130C, and peer computing device 104C includes a first device group API client 130D.

Computing device 102 is also a member of a second device group 140 that includes peer computing devices 104E and 104F that are different from peer computing devices 104A, 104B and 104C of the first device group 132. Each member of the second device group 140 includes an instance of a second device group API client 142, indicated generally in FIG. 1, which enables P2P communications among the members of the second device group 140. More particularly, computing device 102 includes a second device group API client 142A, peer computing device 104E includes second device group API client 142B, and peer computing device 104F includes second device group API client 142C. As with the first device group 132, in other examples the second device group 140 may also include additional peer computing devices, and the peer computing devices 104E and/or 104F may be computing devices different from those depicted in FIG. 1.

With reference now to FIG. 2, the first device group API client 130A includes a plurality of software modules 150. It will be appreciated that the other first device group API clients 130B, 130C, and 130D) on peer computing devices 104A, 104B, and 104C, respectively, include the same plurality of software modules 150 having the functionality as described below. It will also be appreciated that the second device group API clients 142A, 142B, and 142C may also include the same plurality of software modules 150, or one or more different software modules. For ease of description, the software modules 150 will be described only with reference to the first device group API client 130A.

The software modules 150 include a P2P module 154 that is configured to engage in P2P communications with each of the other peer computing devices 104A, 104B, and 104C of the first device group 132 via their respective first device group API clients 130B, 130C, and 130D. In this manner, each member of the first device group 132 has direct access to data and resources of the other members of the group, subject to device-group specific permissions that are described in more detail below.

Software modules 150 include a device discovery module 156 that is configured to dynamically discover one or more peer computing devices that are presently associated with the first device group 132, or additional, non-member computing devices not presently associated with the first device group 132 that may be added to the group on an ad hoc basis. When the device discovery module 156 identifies a non-member computing device, the device discovery module 156 may determine whether the non-member device satisfies one or more device group criteria stored in a permissions module 158.

In one example, the device group criterion may comprise a location of the non-member computing device being within a pre-defined range of the computing device 102 or one of the peer computing devices 104A. 1041B, or 104C. In another example, the device group criterion may comprise a social distance of a user of the non-member computing device being within a pre-defined distance of a user of the computing device 102 or one of the peer computing devices 104A, 104B, or 104C. The pre-defined distance may include the user of the non-member device having a particular social designation (such as "friends" or "friends of friends") on a social networking site with respect to a user of the computing device 102 or one of the peer computing devices 104A, 104B, or 104C.

In another example, the device group criterion may comprise an ownership designation of the non-member computing device being associated with a user of the computing device 102 or one of the peer computing devices 104A, 104B, or 104C. In one example, the computing device 102 is a notebook computer owned by user A. User A buys a new mobile phone which is discovered by device discovery module 156 as a non-member device. Upon determining that the mobile phone is owned by User A, who also owns the notebook computer/computing device 102, the device discovery module 156 adds the mobile phone to the first device group 132.

In another example, when a non-member computing device becomes a peer computing device within the first device group 132, the first device group API client 130A may be exposed to an external web service, such as an ad engine 176 on server 162, to allow the web service to discover the new or modified first device group 132. The first device group 132 may then allow the web service to write a new application on the member devices of the first device group.

The software modules 150 also include a file storage module 160 that is configured to enable the first device group API client 130A to access files stored in a distributed file store associated with the first device group 132. The distributed file store may reside locally on the computing device 102 and/or remotely on one or more of the peer computing devices 104A, 104B, and 104C. The file storage module 160 is also configured to receive a request from a computer program to access a requested file stored in the distributed file store. In one example the requesting computer program may reside locally on the computing device 102 in the form of an application program 122, such as a media player. In other examples the computer program may reside on one of the peer computing devices 104A, 104B, or 104C, or remotely on server 162.

As mentioned above, the software modules 150 also include a permissions module 158 that is configured to determine whether a request received by the file storage module 160 satisfies one or more device-group-specific permissions 164 for access permission of data stored on the computing device 102 and/or any of the peer computing devices 104A, 104B, and 104C. The device-group-specific permissions 164 may include internal permissions 166 and external permissions 168. Internal permissions 166 may include, for example, user data privacy settings for the sharing of various categories of user data among the members of the first device group 132. Categories of user data may include, for example, application usage history, browser history, media data, contact data, calendar data and social network data. The permissions module 158 may be configured to allow a user to set a privacy setting for one or more of the user data categories. External permissions 168 may include device-group-specific permissions required to be satisfied by external requests for access to computing device 102 and/or any of the peer computing devices 104A, 104B, and 104C, such as requests for data stored on any of these first device group members. As described in more detail below, external permissions 168 may include, for example, permissions that must be satisfied before an ad may be served to the first device group 132 from an ad engine 176 on the server 162.

With reference now to FIG. 1, it will be appreciated that the computing device 102 is a member of both the first device group 132 and the second device group 140. Accordingly, the computing device 102 includes a first device group API client 130A and a second device group API client 142A. In one example, server 162 may request a file from the first device group 132 via WAN 170 and the first device group API client 130A on the computing device 102. The permissions module 158 determines whether the request satisfies a first set of device-group-specific permissions, and if so, then the permissions module authorizes the request to access the file. The file storage module 160 then retrieves the file from the distributed file store and outputs the file to the server 162. If the request does not satisfy the first set of device-group specific permissions, then the request is denied.

In another example, if the request satisfies the first set of device-group-specific permissions, the permissions module 158 may be further configured to grant varying levels of access privileges to the file, based on a programmatically determined partial access privilege applicable to the requesting user. For example, the permissions module 158 may be configured to grant a partial access privilege to enable access to only a portion of the data in a file, and/or to enable access to the data in the file only for authorized uses. The partial access privilege, for example, may be formulated according to a privacy preserving function, to protect the privacy of the user in one example. In this example, the request may be authorized to access only portions of information in the requested file, such as non-personally-identifiable information, and/or to access personally identifiable information only for purpose of aggregating such data in a non-personally-identifiable manner. In one use case example, the request may seek to access salary information that is stored on a user's mobile device. The permissions module 158 may authorize the request to access the salary information, provided that the information is subject to a privacy preserving function, such as aggregating the information among a group of users.

The server 162 may also request a file from the second device group 140 via WAN 170 and the second device group API client 142A on the computing device 102. A permissions module in the second device group API client 142A determines whether the request satisfies a second set of device-group-specific permissions, and if so, then the permissions module authorizes the second request to access the file. A file storage module on the second device group API client 142A then retrieves the file from the second device group distributed file store and outputs the file to the server 162. If the request does not satisfy the second set of device-group specific permissions, then the request is denied.

In one example, an application program 122 on the computing device 102 may be a media player. The media player may search for a particular media file in the distributed file stores of the first device group 132 and the second device group 140. If the media player locates the media file in the distributed file store of the first device group 132, the media player may send a device-group-specific request to the first device group API client 130A for the media file. A search module 172 in the first device group API client 130A is configured to search for the media file in the distributed file store. If the media player request satisfies the device-group-specific permissions 164, then the search module 172 streams the media file to the media player via the P2P module 154.

In another example, an ad module 174 in the first device group API client 130A is configured to gather aggregated user data from the members of the first device group 132 according to device-group-specific permissions 164, including for example group-wide privacy settings. As noted above, categories of user data may include, for example, application usage history, browser history, media data, contact data, calendar data and social network data. Upon gathering the aggregated user data, the ad module 174 contacts the permissions module 158 to determine whether the aggregated user data satisfies device-group-specific permissions 164, including user data privacy settings such as opt-in ad settings governing the categories of user data that may be shared with third party services. The permissions module 158 then authorizes the user data that may be sent according to the device-group-specific permissions 164.

Upon a triggering event, such as the downloading of a web page by the browser 124, the ad module 174 sends an ad request, including the authorized aggregated user data, to ad engine 176 on remote server 162. The ad request may also include group-wide characteristics of the first device group 132, such as associations or common connections among group members, the group's social graph associations, location of member devices, etc. The ad module 174 then receives the ad served by the ad engine 176 and determines a presentation style that selects which members of the first device group 132 will receive the ad. The ad module 174 then displays the ad on the selected first device group members according to the presentation style.

It will be appreciated that the ad served by the ad engine 176 is directed to the first device group 132, and therefore may be targeted to the unique group-wide characteristics of the first device group. In another example, where an ad request is initiated by a member of the second device group 140, the ad served by the ad engine 176 may be targeted to unique group-wide characteristics of the second device group.

Figure 3:
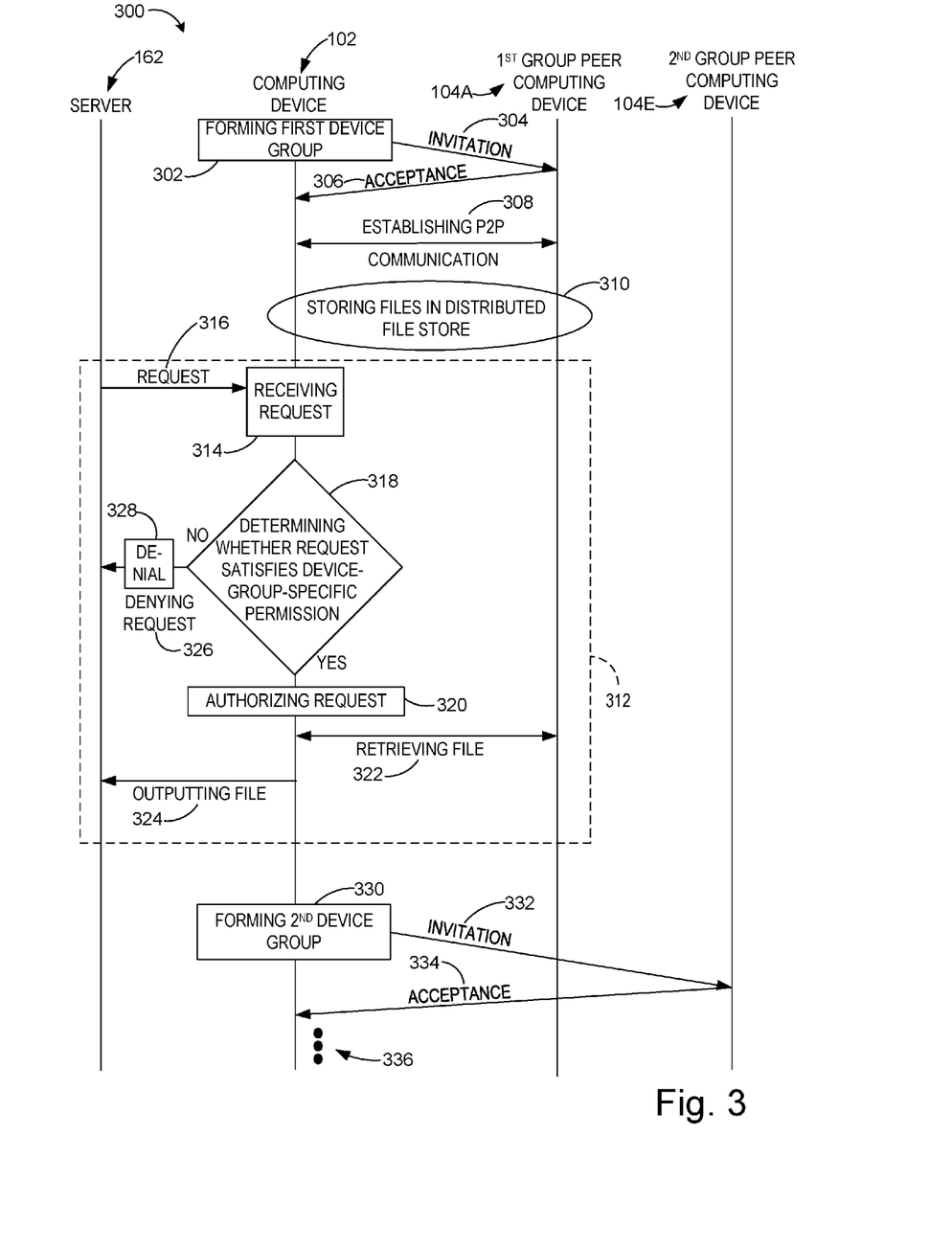
FIG. 3 is a diagram illustrating a method for managing data and showing communications and activities among the computing device, a first device group peer computing device, a second device group peer computing device, and a server.

With reference now to FIG. 3, a diagram illustrates a method 300 for managing data according to one embodiment of the present disclosure. The method may be performed using the software and hardware components of the computing system 100 described above and shown in FIG. 1, or using other suitable components. Method 300 begins at 302 with forming a first device group 132 that includes a computing device, such as computing device 102, and a first group peer computing device, such as peer computing device 104A. This may take the form of the computing device sending an invitation 304 to the first group peer computing device. The first group peer computing device responds by sending an acceptance 306 to the computing device.

In another example and as referenced above, the method may also include forming the device group at least in part by dynamically discovering one or more peer computing devices that are presently associated with the device group, or additional, non-member computing devices that may be added to the group on an ad hoc basis. When a non-member computing device not presently associated with the device group is identified, the method may determine whether the non-member device satisfies a device group criterion. In one example, the device group criterion may comprise a location of the non-member computing device being within a pre-defined range of the computing device or the peer computing device. In another example, the device group criterion may comprise a social distance of a user of the non-member computing device being within a pre-defined distance of a user of the computing device or the peer computing device. In another example, the device group criterion may comprise an ownership designation of the non-member computing device being associated with a user of the computing device or the peer computing devices.

Once the first device group is formed, at 308 the method includes establishing P2P communication between the computing device and the first group peer computing device. At 310, the method includes storing files associated with the computing device or the first group peer computing device in a distributed file store locally on the computing device and/or remotely on the first group peer computing device.

The method then proceeds to a request processing portion 312 in which a request is received and processed to determine whether to authorize or deny the request. At 314, the computing device receives a request 316 from a computer program to access a requested file stored in the distributed file store. In the depicted example the computer program resides remotely on a server, such as server 162. In other examples, the computer program may reside locally on the computing device or remotely on the first group peer computing device. As noted above, the requested file may include user data from the computing device and/or the first group peer computing device. The user data may include information from a variety of user data categories including, for example, application usage history, browser history, media data, contact data, calendar data and social network data.

At 318, the method includes determining whether the request satisfies one or more device-group-specific permissions for access permission of data stored on the computing device and/or the first group peer computing device. If the request satisfies the permissions 164, then the method includes authorizing the request at 320 to fully access or partially access the requested file, retrieving the requested file at 322, and outputting the requested file at 324 to the computer program on the requesting computing device, which in the illustrated embodiment is server 162 but may alternatively be another computing device. If the request does not satisfy the permissions 164, then at 326 the method includes denying the request and sending a request denial 328 to the computer program on the server 162.

At 330, the method may also include forming a second device group of which the computing device is a member. The computing device may send an invitation 332 to a second group peer computing device, such as peer computing device 104E. The second group peer computing device may respond by sending an acceptance 334 to the computing device 102. As indicated at 336, the method may then proceed to implement steps 308-328 as described above and with respect to the second device group and second group peer computing device. In particular, the second device group may have a second set of device-group-specific permissions for access permission of data stored on any device associated with the second device group. The computing device may receive a second request from the computer program to access a second requested file stored in the second distributed file store. The method may then determine whether the second request satisfies the second set of device-group-specific permissions and if so, authorize the second request to fully access or partially access the second requested file. If the second request does not satisfy the second set of device-group-specific permissions, then the request is denied and a request denial is sent to the computer program.

Figure 4:
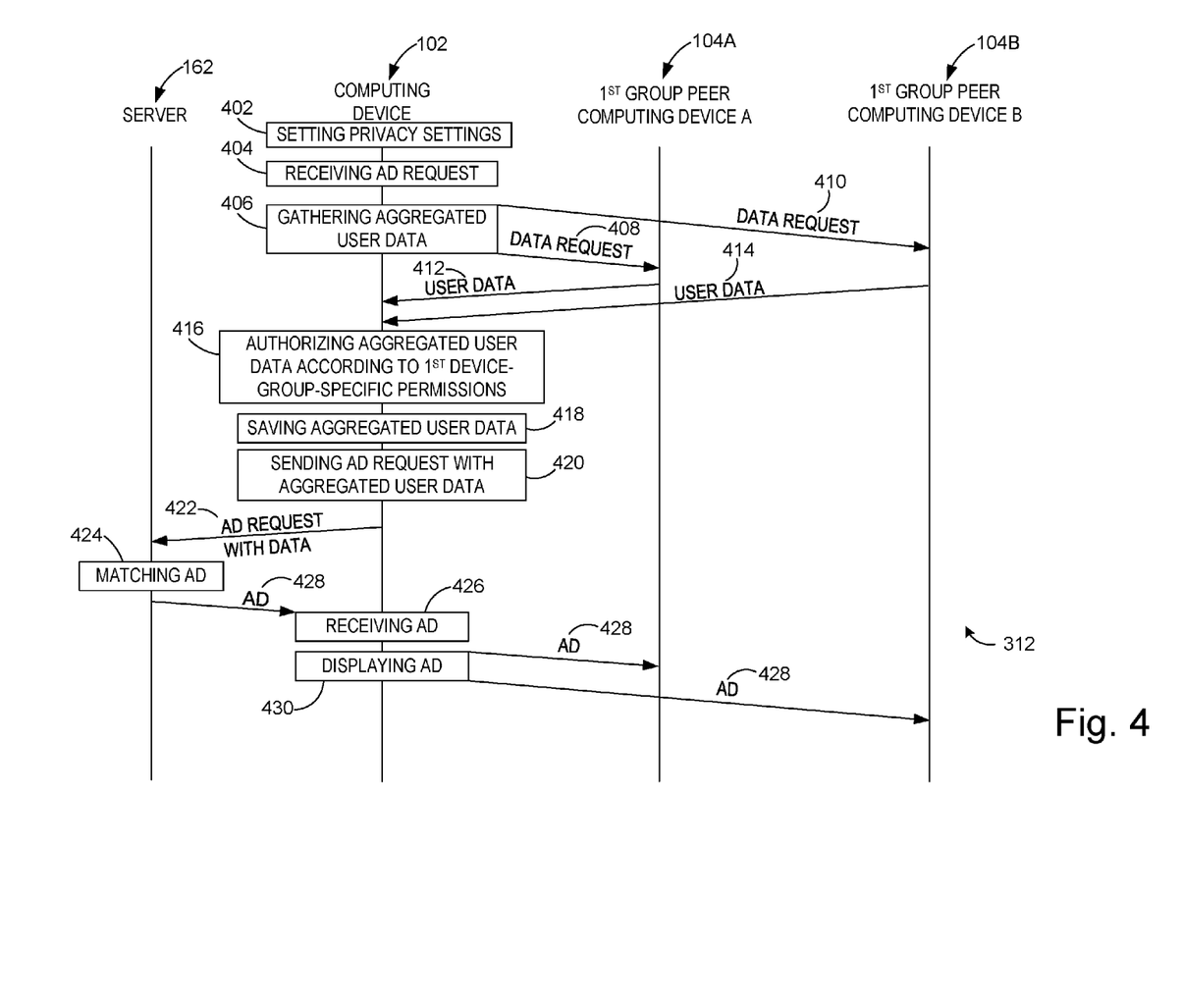
FIG. 4 is a diagram illustrating one example of a request processing portion of the method of FIG. 3, the example including receiving and processing an ad request.

With reference now to FIG. 4, in one example at least part of the request processing portion 312 of method 300 may include receiving and processing an ad request. In FIG. 4, the first device group includes a computing device, such as computing device 102, first group peer computing device A, such as first group peer computing device 104A, and first group peer computing device B, such as first group peer computing device 104B. At 402 the method includes setting one or more privacy settings on the computing device and/or device-group wide across the computing device and the first group peer computing devices A and B. At 404 the computing device receives an ad request. The ad request may be sent from an ad module in a first device group API client of the computing device, from another peer device in the first device group, or from an external source such as server 162.

At 406 the method includes gathering aggregated user data from the computing device 102 and first group peer computing devices A and B. This may take the form of an ad module sending data request 408 to the first group peer computing device A and data request 410 to first group peer computing device B. The first group peer computing devices A and B respond by sending user data 412 and 414, respectively, to the computing device. At 416 the method includes authorizing the aggregated user data to be sent according to first device-group-specific permissions. As noted above, the permissions may include user data privacy settings such as opt-in ad settings governing the categories of user data that may be shared with third party services.

At 418 the method includes saving the aggregated user data in the distributed file store of the first device group. Upon a triggering event, such as the downloading of a web page by a user of the computing device, at 420 the method then includes sending an ad request 422 including the aggregated user data to an ad engine on the server. As noted above, the ad request may also include group-wide characteristics of the first device group, such as associations or common connections among group members, the group's social graph associations, location of member devices, etc. At 424 the ad engine uses the aggregated user data and any group-wide characteristics to match an ad 428 that is targeted to the first device group 132.

At 426 the method includes the computing device receiving the ad 428 from the ad engine. At 430 the method includes displaying the ad 428. The ad may be displayed on a display associated with computing device 102. Alternatively or in addition, the computing device 102 may send the ad 428 to each of the first group peer computing devices A and B, and displaying at 430 may include displaying the ad 428 on each of the first group peer computing devices A and B.

Figure 5:
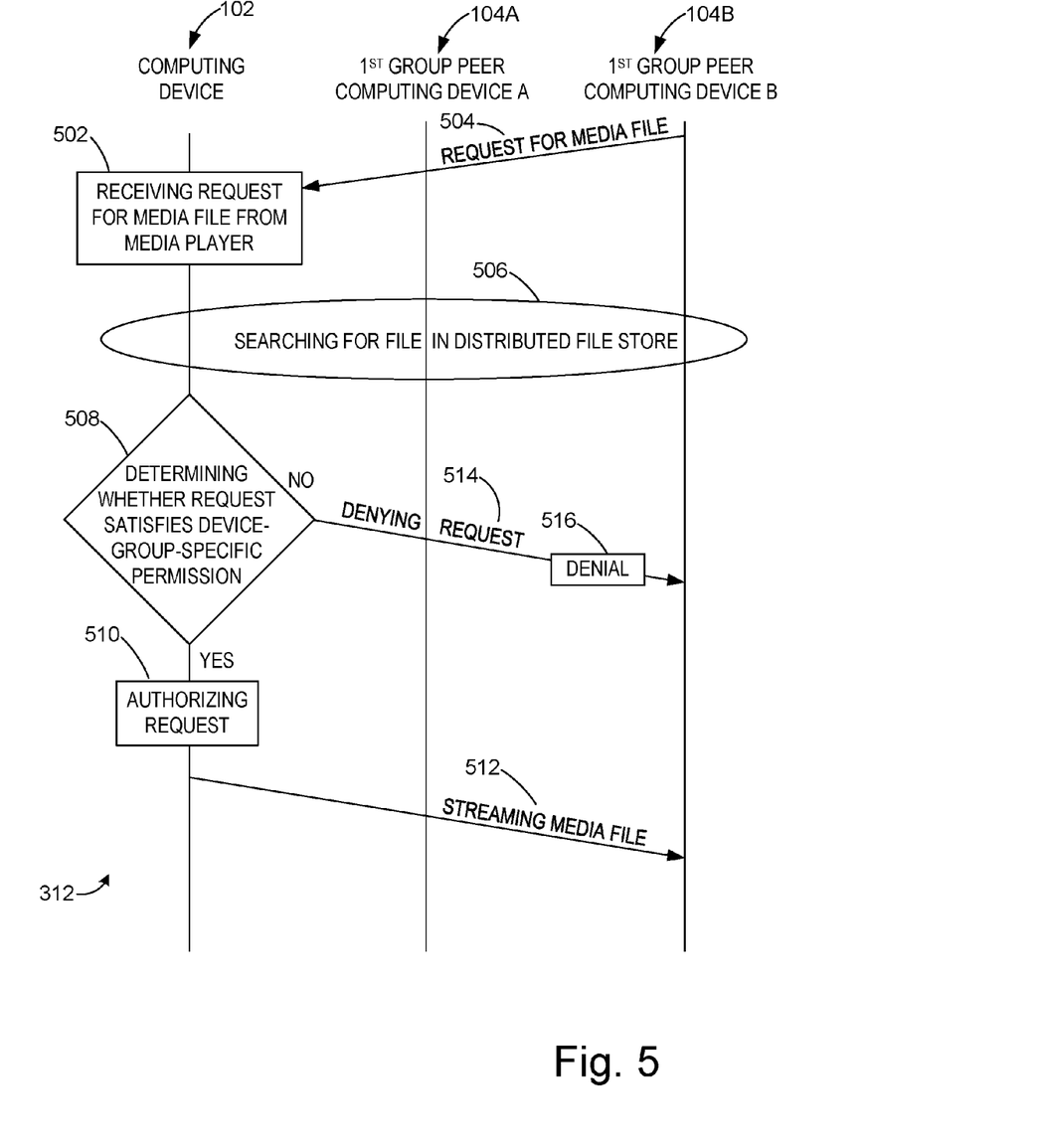
FIG. 5 is a diagram illustrating another example of a request processing portion of the method of FIG. 3, the example including receiving and processing a request for a media file.

With reference now to FIG. 5, in another example at least part of the request processing portion 312 of method 300 may include receiving and processing a request for a media file. In FIG. 5, the first device group includes a computing device, such as computing device 102, first group peer computing device A, such as first group peer computing device 104A, and first group peer computing device B, such as first group peer computing device 104B. At 502 the method includes the computing device receiving a request for a media file 504 from a media player on first group peer computing device B. At 506 the method includes searching for the media file in the distributed file store containing files from the computing device 102 and first group peer computing devices A and B. At 508, the method includes determining whether the request satisfies the device-group-specific permissions of the first device group. If the request satisfies the permissions, then the method includes the computing device authorizing the request at 510, and streaming the media file at 512 to the media player on the first group peer computing device B. If the request does not satisfy the permissions, then at 514 the computing device 102 denies the request and sends a request denial 516 to the media player.

Using the above described systems and methods, users may store data on peer devices and avoid the privacy and security concerns associated with storing their data on remote servers, since the data is not stored on a remote server. Further, these systems and methods have the potential benefit of enabling management of data among a single user's multiple devices and among multiple devices of different users within a network. Additionally, these systems and methods enable both out-of-group and in-group devices to make requests for data stored on one or more peer groups to which a computing device belongs, and receive appropriate responses including the requested data, provided sufficient permissions accompany the request.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for managing data, the method comprising, at a computing device associated with a device group:
    discovering one or more peer computing devices associated with the device group;
    discovering a non-member computing device not presently associated with the device group that satisfies at least one device group criterion;
    adding the non-member computing device to the device group;
    receiving a request from a requesting program to access a requested file stored in the device group;
    determining whether the request satisfies a permission;
    if the request satisfies the permission, authorizing the request to access the requested file, retrieving the requested file from the device group and outputting the requested file to the requesting program; and
    if the request does not satisfy the permission, denying the request to access the requested file.

2. The method of claim 1, wherein the device group is a first device group having a first set of device-group-specific permissions, the method further comprising:
    determining whether the request satisfies the first set of device-group-specific permissions;
    if the request satisfies the first set of device-group-specific permissions, authorizing the request to access the requested file, retrieving the requested file from the device group and outputting the requested file to the requesting program;
    if the request does not satisfy the first set of device-group-specific permissions, denying the request to access the requested file;
    wherein a second device group comprises a second set of device-group-specific permissions, the computing device being a member of the second device group, the method further comprising:
    receiving another request from the requesting program to access another requested file stored in the second device group;
    determining whether other request satisfies the second set of device-group-specific permissions;
    if the other request satisfies the second set of device-group-specific permissions, authorizing the other request to access the other requested file stored in the second device group, retrieving the other requested file from the second device group and outputting the other requested file to the requesting program; and
    if the other request does not satisfy the second set of device-group-specific permissions, denying the other request to access the other requested file stored in the second device group.

3. The method of claim 1, wherein the requested file comprises user data from at least one of a plurality of user data categories, the user data categories selected from the group consisting of application usage history, browser history, media data, contact data, calendar data and social network data, and the method further comprises allowing a user to set a privacy setting for each of the user data categories.

4. The method of claim 3, further comprising:
    gathering aggregated user data from the computing device and at least one of the peer computing devices;
    sending an ad request including the aggregated user data to an ad engine on a remote server, the aggregated user data authorized to be sent according to the permission;
    receiving an ad in response to the ad request; and
    displaying the ad on the computing device and/or the at least one of the peer computing devices.

5. The method of claim 1, further comprising, if the request satisfies the permission, granting a partial access privilege to enable access to only a portion of the data in a file and/or to enable access to the data in the file only for authorized uses.

6. The method of claim 1, wherein the requesting program is a media player and the requested file is a media file, and the method further comprises searching for the media file in the device group and, if the request satisfies the permission, streaming the requested file to the media player.

7. The method of claim 1, further comprising allowing an external web service to write a new application on the computing devices associated with the device group.

8. The method of claim 1, wherein the at least one device group criterion comprises a location of the non-member computing device being within a pre-defined range.

9. The method of claim 1, wherein the at least one device group criterion comprises a social distance of a user of the non-member computing device being within a pre-defined distance.

10. The method of claim 1, wherein the at least one device group criterion comprises an ownership designation of the non-member computing device being associated with a user of the computing device or a user of one of the peer computing devices.

11. A computing device comprising a processor that is configured to:
form a device group that includes the computing device and at least one peer computing device;
establish peer-to-peer communication between the computing device and the at least one peer computing device;
receive a request from a requesting program to access a requested file stored in the device group;
determine that the request satisfies a permission;
in response to determining that the request satisfies the permission, retrieve the requested file from the device group and output the requested file to the requesting program;
discover a non-member computing device that is not presently associated with the device group; and
in response to determining that the non-member computing device satisfies at least one device group criterion, add the non-member computing device to the device group.

12. The computing device of claim 11, wherein the request is a first request, the requested file is a first requested file and the device group is a first device group having a first set of device-group-specific permissions, the processor configured to:
form a second device group of which the computing device is a member, the second device group having a second set of device-group-specific permissions;
store files in the second device group;
receive a second request from the requesting program to access a second requested file stored in the second device group; and
determine whether the second request satisfies the second set of device-group-specific permissions, and if so, authorize the second request to access the second requested file, else deny the second request to access the second requested file.

13. The computing device of claim 11, wherein the requested file comprises user data from at least one of a plurality of user data categories, the user data categories selected from the group consisting of application usage history, browser history, media data, contact data, calendar data and social network data, and the processor is configured to set a privacy setting for each of the user data categories.

14. The computing device of claim 11, wherein the processor is configured to:
gather aggregated user data from the computing device and the at least one peer computing device;
authorize the aggregated user data to be sent according to the permission;
send an ad request including the aggregated user data to an ad engine on a remote server;
receive the ad in response to the ad request; and
display the ad on the computing device and/or the peer computing device.

15. The computing device of claim 11, wherein the requested file is a media file, and the processor is configured to:
receive the request from a media player;
search for the media file in the device group; and
if the request satisfies the permission, stream the media file to the media player.

16. The computing device of claim 11, wherein the processor is configured to allow an external web service to write a new application on the computing devices associated with the device group.

17. The computing device of claim 11, wherein the at least one device group criterion comprises a location of the non-member computing device being within a pre-defined range.

18. The computing device of claim 11, wherein the at least one device group criterion comprises a social distance of a user of the non-member computing device being within a pre-defined distance.

19. The computing device of claim 11, wherein the at least one device group criterion comprises an ownership designation of the non-member computing device being associated with a user of the computing device and/or the at least one peer computing device.

20. A method for managing data, the method comprising, at a computing device:
forming a first device group that includes the computing device and a first peer computing device;
forming a second device group that includes the computing device and a second peer computing device;
establishing peer-to-peer communication among the computing device, the first peer computing device and the second peer computing device;
receiving a request from a requesting program to access a requested file located in the first device group or the second device group;
searching for the requested file in the first device group and the second device group;
if the requested file is located in the first device group, determining whether the request satisfies a first device-group-specific permission for access permission of data stored on any device associated with the first device group;
if the request satisfies the first device-group-specific permission, authorizing the request to access the requested file;
if the request does not satisfy the first device-group-specific permission, denying the request to access the requested file;
if the requested file is located in the second device group, determining whether the request satisfies a second device-group-specific permission for access permission of data stored on any device associated with the second device group;
if the request satisfies the second device-group-specific permission, authorizing the request to access the requested file;
if the request does not satisfy the second device-group-specific permission, denying the request to access the requested file;
if the request is authorized, retrieving the requested file from the first device group or the second device group, and outputting the requested file to the computer program; and
discovering a non-member computing device that is not presently associated with the first device group, and that satisfies at least one device group criterion of the first device group, and adding the non-member computing device to the first device group.

* * * * *